United States Patent
Altenpohl et al.

[15] 3,643,790
[45] Feb. 22, 1972

[54] NONJAM LEAD-ON TRACK FOR CONVEYOR SYSTEMS

[72] Inventors: William F. Altenpohl; Paul J. Altenpohl, both of Union Hill Road, Conshohocken, Pa. 19428

[22] Filed: Oct. 16, 1970

[21] Appl. No.: 81,374

[52] U.S. Cl. ....................................................198/177 R
[51] Int. Cl. .......................................................B65g 17/20
[58] Field of Search ................198/177, 137, 130, 39; 17/24

[56] References Cited

UNITED STATES PATENTS

| | | | |
|---|---|---|---|
| 2,800,106 | 7/1957 | Nelson | 198/177 X |
| 2,456,224 | 12/1948 | Sullivan | 198/177 |

*Primary Examiner*—Richard E. Aegerter
*Assistant Examiner*—Douglas D. Watts
*Attorney*—Clarence A. O'Brien and Harvey B. Jacobson

[57] ABSTRACT

Jamming of article carriers on the lead-on ramp of a track causes displacement of the ramps to retracted positions and stoppage of the conveyor from which the carriers are suspended. The ramps are pivotally mounted by crank elements projecting forwardly from the track and are yieldably held in operative and retracted positions by detents.

16 Claims, 7 Drawing Figures

William F. Altenpohl
Paul J. Altenpohl
INVENTORS

BY Clarence A. O'Brien
and Harvey B. Jacobson
Attorneys

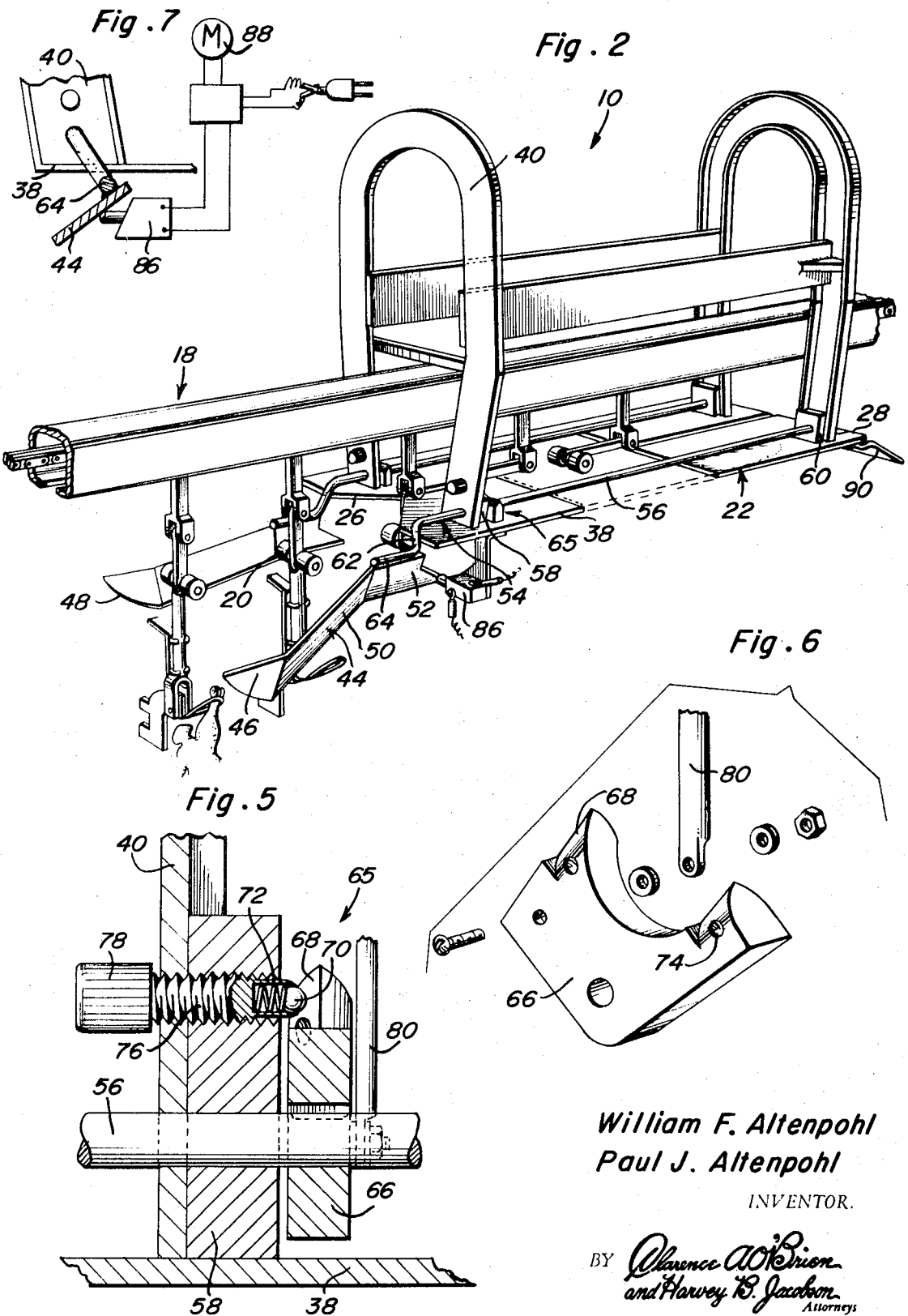

NONJAM LEAD-ON TRACK FOR CONVEYOR SYSTEMS

This invention relates to an improved ramp structure for loads vertically suspended from a moving conveyor and more particularly to a system for overcoming the jamming of the track by tangled carriers.

A problem that is quite prevalent in poultry weight sorting systems wherein spaced poultry carriers are suspended from a continuously moving overhead conveyor, resides in the tangling of adjacent carriers causing jamming along the lead-on ramp section of the track. Breakage of expensive apparatus often occurs as a result of such jamming and constant supervision by personnel is needed in order to timely effect power shutdown and clear the track. Such jamming problems occur for example, with weight sorting equipment such as disclosed in U.S. Pat. No. 3,291,303. It is therefore an important object of the present invention to provide means for automatically responding to a jamming condition during operation of the aforementioned apparatus by releasing the tangled carriers which cause the jam and shut down the power for operating the conveyor.

In accordance with the present invention, the lead-on ramp of the stationary track associated with a weight selection sorting device or the like, is pivotally mounted by crank elements forwardly projecting from the stationary track sections so that the ramp elements may be pivotally deflected downwardly and laterally of the stationary track sections by excessive horizontal pressure applied by tangled carrier suspension elements to the inclined portions of the ramp elements. The ramp elements when so displaced to retracted positions, permit the carriers to drop free. Also, in response to retraction of the ramp, the power supplied to the conveyor motor is interrupted so as to stop movement of the carriers in order to permit personnel to rectify the condition.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a perspective view showing the apparatus in an inoperative position following a jamming condition;

FIG. 5 is an enlarged sectional view taken substantially through a plane indicated by section line 5—5 in FIG. 4;

FIG. 6 is a perspective view showing some of the disassembled parts of the detent mechanism associated with the apparatus; and FIG. 7 is a partial transverse sectional view of a portion of the apparatus shown in FIG. 1.

Figure 1:
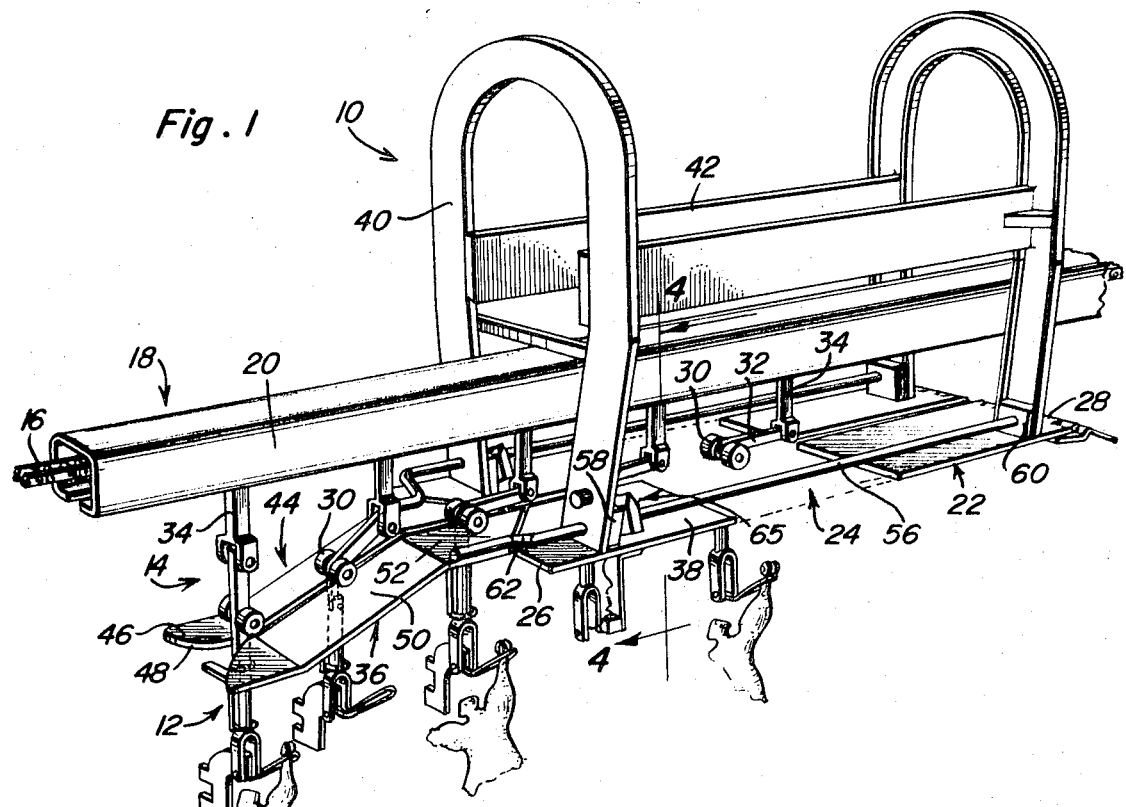
FIG. 1 is a perspective view showing a typical installation for the improvement of the present invention.

Referring now to the drawings in detail, FIGS. 1 and 2 illustrate a typical installation for the improvement of the present invention generally denoted by reference numeral 10. This type of installation is disclosed for example in application Ser. No. 828,606, filed May 28, 1969 owned in common with the present application by the same assignee. A plurality of poultry carriers generally referred to by reference numeral 12 are suspended by suspension link assemblies 14 from the conveyor chain 16 of a conveyor generally referred to by reference numeral 18 also having a fixedly mounted enclosure 20 for the conveyor chain. It will be apparent that the loads on the carriers 12 in addition being conveyed are also vertically supported from the conveyor. In order to monitor the weight of the loads for sorting purposes, the vertical load of the carrier is transferred from the conveyor 18 to a stationary track assembly generally referred by reference numeral 22 vertically spaced below the conveyor in order to effect weighing of the load at a weighing station 24 intermediate the forward and rear ends 26 and 28 of the stationary track assembly. The carrier suspension link assembly 14 accordingly includes rollers 30 at the upper ends of the carriers interconnected by pulling links 32 to the conveyor chain suspension links 34. The rollers 30 when approaching the forward end 26 of the track assembly ride up a ramp assembly generally referred to by reference numeral 36 for gradual transfer of the vertical load from the conveyor to the track assembly.

The stationary track assembly 22 includes a pair of laterally spaced track sections 38 between which a gap is formed in order to accommodate suspension of the carrier from the lower end of the pulling link 32. The track sections 38 are secured as by welding to the lower ends of the legs of inverted U-shaped frame members 40. At least two of said frame members are interconnected by bars 42 to form a rigid frame assembly straddling the conveyor 18 in order to support the track assembly 22 a proper distance therebelow.

The lead-on ramp assembly 36 includes a pair of laterally spaced ramp members 44 which include a forward horizontal portion 46 having curved entrance edges 48 to guide the approaching carriers 12 into the gap between the members along the upwardly inclined portions 50 terminated by upper transition portions 52 flush with the stationary track sections 38 in the operative position of the ramp assembly as shown in FIG. 1.

The ramp members 44 are supported by a pair of crank elements 54. Each crank element includes a crankshaft 56 rotatably mounted about an axis parallel to the track assembly by means of bearing blocks 58 and 60 secured to the lower ends of the legs associated with the frame members 40. The forward ends of the crankshafts 56 at the forward edges 26 of the track members, are connected to offset crank portions 62 from which terminal end portions 64 of the crank elements extend parallel to the pivotal axes through the crankshafts 56. The terminal end portions 64 of the crank elements are secured as by welding to the laterally outer edges of the upper portions 52 of the ramp members. As a result of this arrangement, the ramp members are pivotably movable from an operative position as illustrated in FIG. 1 to a retracted or inoperative position as illustrated in FIG. 2 wherein the ramp members 44 extend downwardly and are laterally spaced from each other a sufficient distance to permit the carriers and suspension links 14 to fall free. In the inoperative positions of the ramp members, the rollers 30 pass under the stationary track assembly.

On occasion, adjacent carriers or suspension links become tangled with each other because of accidental deflection by personnel. Should a pair of tangled carriers engage the ramp assembly 36, approaching the stationary track assembly 22, they would bind within the gap between the ramp members 44 as the conveyor continues to exert a forward pulling force thereon. Rupture of parts would therefore occur. Under such a jamming condition, an excessive horizontal force will be applied by the pulling links through the rollers 30 the the inclined portions 50 of the ramp members. This excessive force or pressure will be operative to pivotably displace the ramp members from the operative positions shown in FIG. 1 to the inoperative positions shown in FIG. 2 to avoid rupture of parts. It is essential however, that the ramp members 44 be yieldably held in their operative positions with sufficient holding force to resist the normal opening pressures applied as the rollers 30 ride up the inclined portions 50 to transfer the vertical load from the conveyor to the stationary track sections. Toward this end, a pair of detent mechanisms generally referred to by reference numeral 64 are mounted at the lower ends of the legs associated with the frame members 40.

Figure 4:
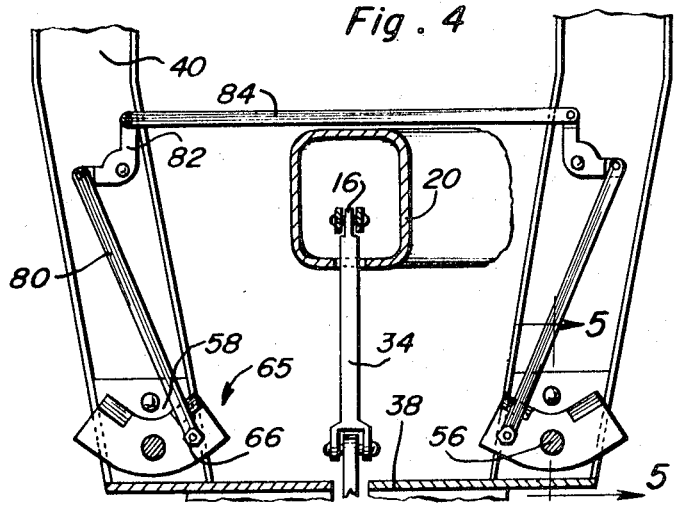
FIG. 4 is an enlarged partial sectional view taken substantially through a plane indicated by section line 4—4 in FIG. 1.

As more clearly seen in FIGS. 4, 5 and 6, each of the detent mechanisms 64 includes a cam member 66 secured to an associated crankshaft 56 for angular displacement therewith to two operative positions. The cam member includes angularly spaced profiled surfaces 68 adapted to axially displace ball detent elements 70 against the bias of springs 72 as the ramp members 44 move toward either of its two positions. The detent ball elements are received within recesses 74 formed adjacent the angularly spaced profiled surface portions 68 of the cam member in order to yieldably hold the ramp members in their two positions as respectively illustrated in FIGS. 1 and 2. The holding force with which the detent elements 70 hold the ramp members may be regulated by means of the externally threaded holders 76 from which the ball detents 70 project. The holders 76 are threadedly mounted within the bearing blocks 58 so that the ball detents 70 may project from one side thereof into engagement with the cam member 76 while the opposite ends of the holders project through aligned openings in the legs of the frame member and are provided with adjustment knobs 78. Thus, the holders may be axially positioned in order to adjust the spring pressure of the detent devices 64.

The cam members 66 may also be interconnected by links 80, levers 82 and a connecting rod 84 pivotally mounted by means of levers 82 on the forward frame member 40 in order to ensure that both ramp members 44 are simultaneously displaced between the two positions. Also, whenever the ramp members are displaced to the inoperative positions as shown in FIG. 2, a limit switch 86 is engaged. As diagrammatically shown in FIG. 7, actuation of the limit switch is operative to interrupt the supply of electrical energy to the conveyor motor 88 thereby stopping operation of the conveyor and movement of the carriers.

Figure 3:
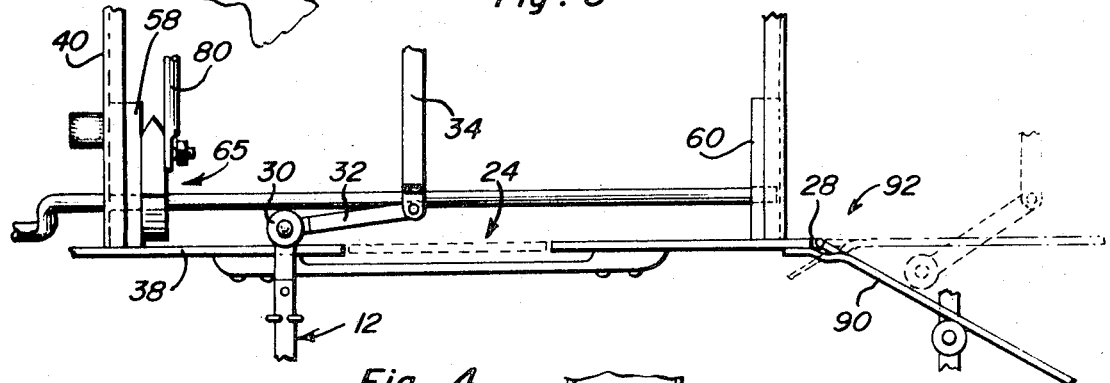
FIG. 3 is a partial side elevational view of a portion of the apparatus shown in FIG. 1.

When the jamming condition is rectified, the ramp members may be manually displaced to the operative positions so that operation of the conveyor may be resumed and the loads gradually transferred by means of the ramp assembly from the conveyor to the stationary track sections. Any of the suspension links that passed under the stationary track sections, may continue to pass under leadoff track sections 90 by upward pivotal displacement thereof as shown in FIG. 3. Accordingly, the leadoff track sections 90 are pivotally suspended by one-way pivot assemblies 92 from the rear ends 28 of the fixed track sections so that they may accommodate gradual transfer of the carrier loads from the stationary track sections to the conveyor as the loads leave the track sections.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a power-operated conveyor from which spaced carriers are suspended, a frame mounting a track section vertically spaced below the conveyor, means connected to the carriers for supporting the same on, the track section while being moved therealong by the conveyor, ramp means engageable by the carriers while approaching the track section for transferring vertical support from the conveyor to the track section, and means responsive to excessive pressure exerted on the ramp means by the carriers for displacing the ramp means from an operative position relative to the track section.

2. The combination of claim 1 including means for disabling operation of the conveyor in response to said displacement of the ramp means from the operative position to an inoperative position.

3. The combination of claim 2 including detent means for yieldably holding the ramp means in said operative and inoperative positions.

4. The combination of claim 3 wherein said frame includes vertical legs straddling the conveyor having lower ends to which the track section is secured.

5. The combination of claim 4 including a crank element pivotally mounted by the frame and connected to the ramp means, said crank element being pivotally movable about an axis parallel to the track section.

6. The combination of claim 5 wherein said ramp means includes a portion inclined relative to said axis displaceable downwardly and laterally of the track section.

7. The combination of claim 6 wherein said detent means includes a cam member secured to the crank element having spaced recesses formed therein, and spring-pressed engaging means mounted by the frame for reception in said recesses.

8. The combination of claim 7 including upwardly deflectable leadoff members extending rearwardly and downwardly from the track section.

9. The combination of claim 1 including detent means for yieldably holding the ramp means in said operative and inoperative positions.

10. The combination of claim 9 including a crank element pivotally mounted by the frame and connected to the ramp means, said crank element being pivotally movable about an axis parallel to the track section.

11. The combination of claim 10 wherein said detent means includes a cam member secured to the crank element having spaced recesses formed therein, and spring-pressed engaging means mounted by the frame for reception in said recesses.

12. The combination of claim 1 including a crank element pivotally mounted by the frame and connected to the ramp means, said crank element being pivotally movable about an axis parallel to the track section.

13. The combination of claim 12 wherein said ramp means includes a portion inclined relative to said axis displaceable downwardly and laterally of the track section.

14. The combination of claim 1 including upwardly deflectable leadoff members extending rearwardly and downwardly from the track section.

15. The combination of claim 1 wherein said frame includes vertical legs straddling the conveyor having lower ends to which the track section is secured.

16. The combination of claim 1 wherein said ramp means includes a pair of ramp members closely spaced in parallel relation to a path along which the carriers are conveyed, and linkage means interconnecting the ramp members for simultaneous displacement in response to excessive pressure applied to one of the ramp members.

* * * * *